United States Patent
Cheng et al.

(10) Patent No.: US 11,455,490 B2
(45) Date of Patent: *Sep. 27, 2022

(54) IMAGE-RECOGNITION APPARATUS, IMAGE-RECOGNITION METHOD, AND NON-TRANSITORY COMPUTER-READABLE STORAGE MEDIUM THEREOF

(71) Applicant: Wistron Corp., New Taipei (TW)

(72) Inventors: Chih-Wei Cheng, New Taipei (TW); Tsai-Sheng Shen, New Taipei (TW); Kuang-Yu Wang, New Taipei (TW)

(73) Assignee: WISTRON CORP., New Taipei (TW)

( * ) Notice: Subject to any disclaimer, the term of this patent is extended or adjusted under 35 U.S.C. 154(b) by 27 days.

This patent is subject to a terminal disclaimer.

(21) Appl. No.: 16/885,576

(22) Filed: May 28, 2020

(65) Prior Publication Data

US 2021/0027099 A1 Jan. 28, 2021

Related U.S. Application Data

(60) Provisional application No. 62/877,375, filed on Jul. 23, 2019.

(30) Foreign Application Priority Data

Apr. 15, 2020 (TW) .................... 109112604

(51) Int. Cl.
*G06K 9/62* (2022.01)
*G06T 7/00* (2017.01)
*G06N 20/20* (2019.01)

(52) U.S. Cl.
CPC ........... *G06K 9/6256* (2013.01); *G06N 20/20* (2019.01); *G06T 7/0004* (2013.01)

(58) Field of Classification Search
CPC ..... G06K 9/6256; G06N 20/20; G06T 7/0004
See application file for complete search history.

(56) References Cited

U.S. PATENT DOCUMENTS 10,140,553 B1 * 11/2018 Vasisht ............... G06K 9/6267
10,983,478 B2 4/2021 Cheng et al.
(Continued)

FOREIGN PATENT DOCUMENTS

| AU | 2002320676 B2 | 3/2005 |
| CN | 104677914 A | 6/2015 |

(Continued)

OTHER PUBLICATIONS

Chinese language office action dated Jan. 29, 2021, issued in application No. TW 109112604.

(Continued)

*Primary Examiner* — Umair Ahsan
(74) *Attorney, Agent, or Firm* — McClure, Qualey & Rodack, LLP

(57) ABSTRACT

An image-recognition method is provided. The method includes the following steps: receiving a plurality of check-point images, and classifying the check-point images into a plurality of groups; classifying the check-point images in each group into a plurality of types to generate first structured data; balancing a number of the check-point images in each type of each group in the first structured data to generate second structured data, wherein the second structured data includes training-set data and testing-set data; training an artificial-intelligence (AI) model using the training-set data; and inputting the testing-set data into the AI model to obtain a model evaluation of the AI model.

18 Claims, 4 Drawing Sheets

(56) References Cited

U.S. PATENT DOCUMENTS

2019/0138786 A1    5/2019  Trenholm et al.
2019/0205620 A1*   7/2019  Yi ..................... G06K 9/00268
2020/0342328 A1* 10/2020  Revaud ................ G06N 3/0454
2021/0166374 A1*   6/2021  Banno ..................... G06T 7/11

FOREIGN PATENT DOCUMENTS

| | | |
|---|---|---|
| CN | 106530284 A | 3/2017 |
| CN | 109190643 A | 1/2019 |
| TW | I664586 B | 7/2019 |

OTHER PUBLICATIONS

Chinese language office action dated May 10, 2021, issued in application No. TW 109112603.
Indian language office action dated Jul. 20, 2021, issued in application No. IN 202024030016 (including English language translation).
Indian language office action dated Sep. 15, 2021, issued in application No. IN 202024030047 (including English language translation).
Patent Application filed in corresponding Indian application No. IN 202024030016, published Jan. 29, 2021.
Non-Final Office Action dated Mar. 14, 2022, issued in U.S. Appl. No. 16/885,594 (copy not provied).

\* cited by examiner

IMAGE-RECOGNITION APPARATUS, IMAGE-RECOGNITION METHOD, AND NON-TRANSITORY COMPUTER-READABLE STORAGE MEDIUM THEREOF

CROSS REFERENCE TO RELATED APPLICATIONS

This application claims the benefit of U.S. Provisional Application No. 62/877,375, filed Jul. 23, 2019, and this application also claims priority of Taiwan Patent Application No. 109112604, filed on Apr. 15, 2020, the entirety of which are incorporated by reference herein.

BACKGROUND OF THE DISCLOSURE

Field of the Disclosure

The present disclosure relates to automated optical inspection, and, in particular, to an image-recognition apparatus, an image-recognition method, and a non-transitory computer-readable storage medium thereof.

Description of the Related Art

Automated optical inspection (AOI) is a common representative method in industrial processes that can be used, for example, to inspect to-be-tested items such as printed circuit boards (PCBs), flat display panels, semiconductor devices, electronic products, optical apparatuses, mechanical mechanisms, molds, etc. For example, the AOI system can use optical instruments to obtain the surface status of the finished product, and then use computer image-processing technology to detect defects such as foreign objects or abnormal patterns. Because it is a non-contact inspection, it can check semi-finished products at the intermediate node of the production line. For example, bare PCBs and assembled PCBs can be regarded as intermediate nodes.

The automatic optical inspection system can be used in the manufacturing or assembly process of the to-be-tested object to check different features of the to-be-tested object or semi-finished product, where the features may be but not limited to, integrity (e.g., fracture, continuity, and crack) and size of the conductor (e.g., wires), size and position of the insulator or substrate, size and position of holes, size and position of vias, conductor pitch, line width and length, solder condition, component position, solder joint defects, etc.

However, the conventional AOI system will set quite strict judgement condition to exclude unqualified products, but many qualified products are judged as defective by the conventional AOI system in the aforementioned process. When manufacturing a large number of products on the factory side, there is no effective method to detect products that are mistakenly judged as defective.

BRIEF SUMMARY OF THE DISCLOSURE

A detailed description is given in the following embodiments with reference to the accompanying drawings.

In an exemplary embodiment, a computer program product comprising a non-transitory computer-readable storage medium storing an artificial-intelligence image-recognition program which is executed by a computer to cause the computer to function as: an image-labeling module, configured to receive a plurality of check-point images, and classify the check-point images into a plurality of groups; an image-classification module, configured to classify the check-point images in each group into a plurality of types to generate first structured data; an image-generating module, configured to balance a number of the check-point images in each type of each group in the first structured data to generate second structured data, wherein the second structured data comprises training-set data and testing-set data; a model-training module, configured to train an artificial-intelligence (AI) model using the training-set data; and a model-evaluation module, configured to input the testing-set data into the AI model to obtain a model evaluation of the AI model.

In some embodiments, the image-recognition apparatus further includes an image-dividing module that is configured to receive an object image of a device under test (DUT) from an automated-optical-inspection (AOI) apparatus, and divide the object image into the check-point images corresponding to a plurality of check points on the DUT.

In some embodiments, the image-dividing module sets a search range on the object image, and sets one or more labeling ranges within the search range, and set relative positions of different check points within each labeling range. The image-dividing module searches the one or more labeling ranges within the search range, and divide the object image into the check-point image corresponding to each check point according to the relative position of each check point within the corresponding labeling range.

In some other embodiments, the check-point images are from an AOI apparatus, and the check-point images correspond to a plurality of check points of a DUT captured by the AOI apparatus.

In some embodiments, each group labeled by the image-labeling module corresponding to a plurality of defective statuses and a pass status of a plurality of check point on a DUT.

In some embodiments, the image-classification module classifies the check-point images in each group into the types to generate the first structured data according to similarities of the check-point images in each group.

In some embodiments, in response to the similarity between each check-point image in each group and one or more reference images in a specific type being higher than a similarity threshold, the image-classification module classifies the check-point images in each group having greater similarities than the similarity threshold into the specific type.

In some embodiments, each type in each group of the first structured data records corresponding serial numbers of the check-point images, which is output as a classification file by the image-classification module.

In some embodiments, there is a first number of the check-point images in each group of the second structure data generated by the image-generating module, and a second number of the check-point images in each type of each group is obtained by dividing the first number by a number of types in each group.

In some embodiments, the image-generating module sets the variation range of each of one or more image parameters, and the image-generating module randomly generates each image parameter from the variation range of each image parameter to perform image processing on the check-point images to generate a plurality of simulated check-point images.

In some embodiments, the first sum, which is the sum of the number of check-point images and the number of simulated check-point images in a first group, is equal to a first number. The second sum, which is the sum of the number of check-point images and the number of simulated check-point images in each of the other groups, is equal to the first number. The sum of the number of check-point images and the number of simulated check-point images in each type of each group is equal to the first number divided by a number of types in each group.

In some embodiments, the model-training module divides the second structured data into the training-set data and the testing-set data according to a predetermined ratio.

In some embodiments, the AI model comprises an input layer, a transfer model, a classification layer, and an output layer, and the model-training module defines a plurality of strategic parameters during a training procedure of the transfer model, wherein the strategic parameters includes a type of an optimizer, a learning rate, a number of epochs, and a batch size.

In some embodiments, the model-evaluation module further determines one or more first types with a lower overall recognition rate or confidence, and filters out the check-point images that are erroneously labeled or have multiple labels in the second structured data.

In some embodiments, the model-evaluation module further executes a first data-cleaning process to delete the check-point images that are erroneously labeled from the training-set data to update the second structured data. The model-evaluation module further executes a second data-cleaning process to filter out one or more first check-point images that have multiple labels, and deletes the check-point images, that correspond to the one or more first check-point images, from the training-set data to update the second structured data.

In some embodiments, the model-training module further retrains the AI model using the updated second structured data.

In another exemplary embodiment, an image-recognition method is provided. The method includes the following steps: receiving a plurality of check-point images, and classify the check-point images into a plurality of groups; classifying the check-point images in each group into a plurality of types to generate first structured data; balancing a number of the check-point images in each type of each group in the first structured data to generate second structured data, wherein the second structured data includes training-set data and testing-set data; training an artificial-intelligence (AI) model using the training-set data; and inputting the testing-set data into the AI model to obtain a model evaluation of the AI model.

In yet another exemplary embodiment, an image-recognition apparatus is provided. The image-recognition apparatus includes: a non-volatile memory, configured to store an artificial-intelligence (AI) image-recognition program; and a processor, configured to perform the AI image-recognition program to perform the following steps: receiving a plurality of check-point images, and classify the check-point images into a plurality of groups; classifying the check-point images in each group into a plurality of types to generate first structured data; balancing a number of the check-point images in each type of each group in the first structured data to generate second structured data, wherein the second structured data comprises training-set data and testing-set data; training an artificial-intelligence (AI) model using the training-set data; and inputting the testing-set data into the AI model to obtain a model evaluation of the AI model.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
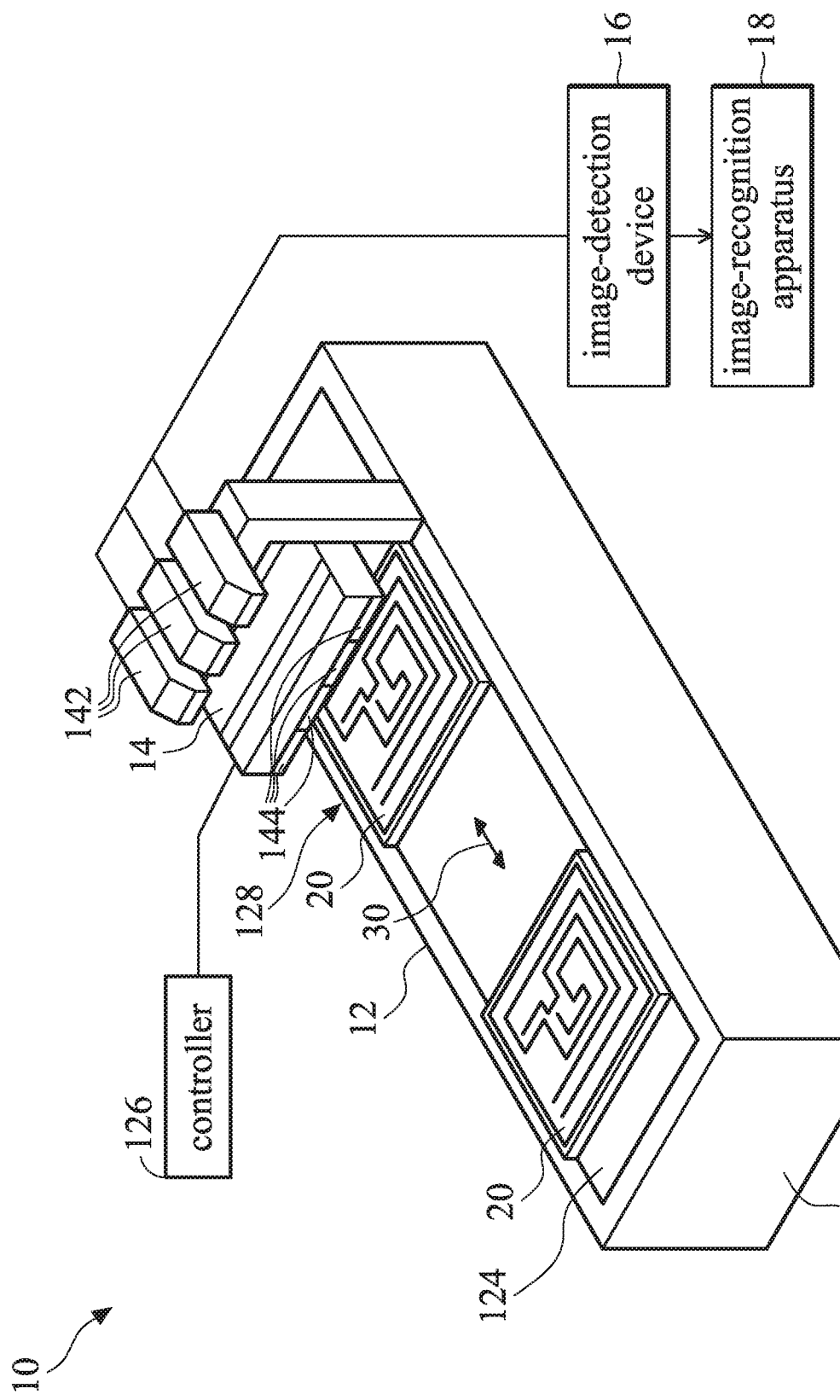
FIG. 1 is a diagram of an automated-optical-inspection system in accordance with an embodiment of the disclosure.

FIG. 1 is a diagram of an automated-optical-inspection system in accordance with an embodiment of the disclosure.

As depicted in FIG. 1, the AOI system 10 includes an automatic conveying device 12, an AOI device 14, an image-inspection device 16, and an image-recognition apparatus 18. The automatic conveying device 12 includes, for example, a casing 122 and a driving mechanism 124. The driving mechanism 124 is disposed above the casing 122 to sequentially deliver one or more devices under test (DUTs) 20 a detection-positioning point 128 on the casing 122, so that the AOI device can take a picture of the DUT 20 or perform an optical-inspection procedure to obtain one or more object images. The driving mechanism 124 can be realized by, for example, a conveyor belt or a robot arm, and the direction of the driving mechanism 124 to transport the DUT 20 (as indicated by arrow 30) is controlled by the controller 126. For example, the controller 126 may be implemented by a microcontroller, a programmable logic controller (PLC), or a personal computer, but the disclosure is not limited thereto.

The AOI device 14 includes one or more image sensors 142 and one or more illumination devices 144, wherein the illumination device 144 is used to provide light to the DUT 20 on the detection-positioning point 128. The image sensor 142 is used to take a picture of the DUT 128 on the detection-positioning point 128 to obtain the object image. The illumination device 144 can be implemented by, for example, a light-emitting diode (LED) or different types of light sources, and the image sensor 142 can be implemented by a charge-coupled device (CCD) sensor or a complementary-metal-oxide-semiconductor (CMOS) sensor, but the disclosure is not limited thereto. In addition, the overall field of view (FOV) of the image sensors 142 in the AOI device 14 may cover the DUT 20 on the detection-positioning point 128.

The image-detection device 16 may be implemented, for example, by a personal computer or a server. In an embodiment, the image-detection device 16 is configured to obtain the object image of the DUT 20 from the image sensor 142, perform image pre-processing on the object image, and perform optical image recognition on the processed object image, thereby determining whether one or more check points in the DUT are defective.

For example, the aforementioned image pre-processing may include but not limited to noise cancellation, enhancing image contrast, enhancing image edges, capturing image features, image scaling and rotation, image alignment and calibration, image transformation, etc. The image-detection device 16 may use relevant image pre-processing techniques on the object image, and it is easier to perform subsequent image analysis and image recognition on the processed object image. In some embodiments, the image-detection device 16 can be omitted, and the aforementioned image pre-processing may be performed by the image-recognition apparatus 18. In some other embodiments, the image-detection device 16 can be integrated into the image-recognition apparatus 18.

In the first embodiment, the image-detection device 16 is configured to obtain the object image of the DUT 20 from the image sensor 142, and perform image pre-processing on the object image. Then, the image-detection device 16 transmits the processed object image to the image-recognition apparatus 18 for subsequent image processing.

In the second embodiment, the image-detection device 16 may perform machine-vision software to divide the processed object image into one or more check-point images, and perform image recognition on each check-point image, wherein the machine-vision software may preset image-recognition conditions corresponding to each check-point image of the object image of the DUT 20, thereby recognizing the defective status of each check point. Taking a printed circuit board (PCB) as an example, the defective status of each check point may include: missing component, skew, tombstone, wrong component, foreign component, flipped component, wrong polarity, lifted lead, lead defective, solder bridge, insufficient solder, short circuit, false welding (air welding), cold welding, etc., but the disclosure is not limited thereto. After setting image-recognition condition corresponding to DUTs of different types, the image-detection device 16 may transmit the check-point images in which the defective status is recognized to the image-recognition apparatus 18 for subsequent processing. In some embodiments, the image-recognition apparatus may also obtain the check-point images or object images from a cloud database (not shown in FIG. 1), but the disclosure is not limited thereto. For convenience of description, the DUT 20 in the following embodiments is described using a PCB as an example.

Figure 2:
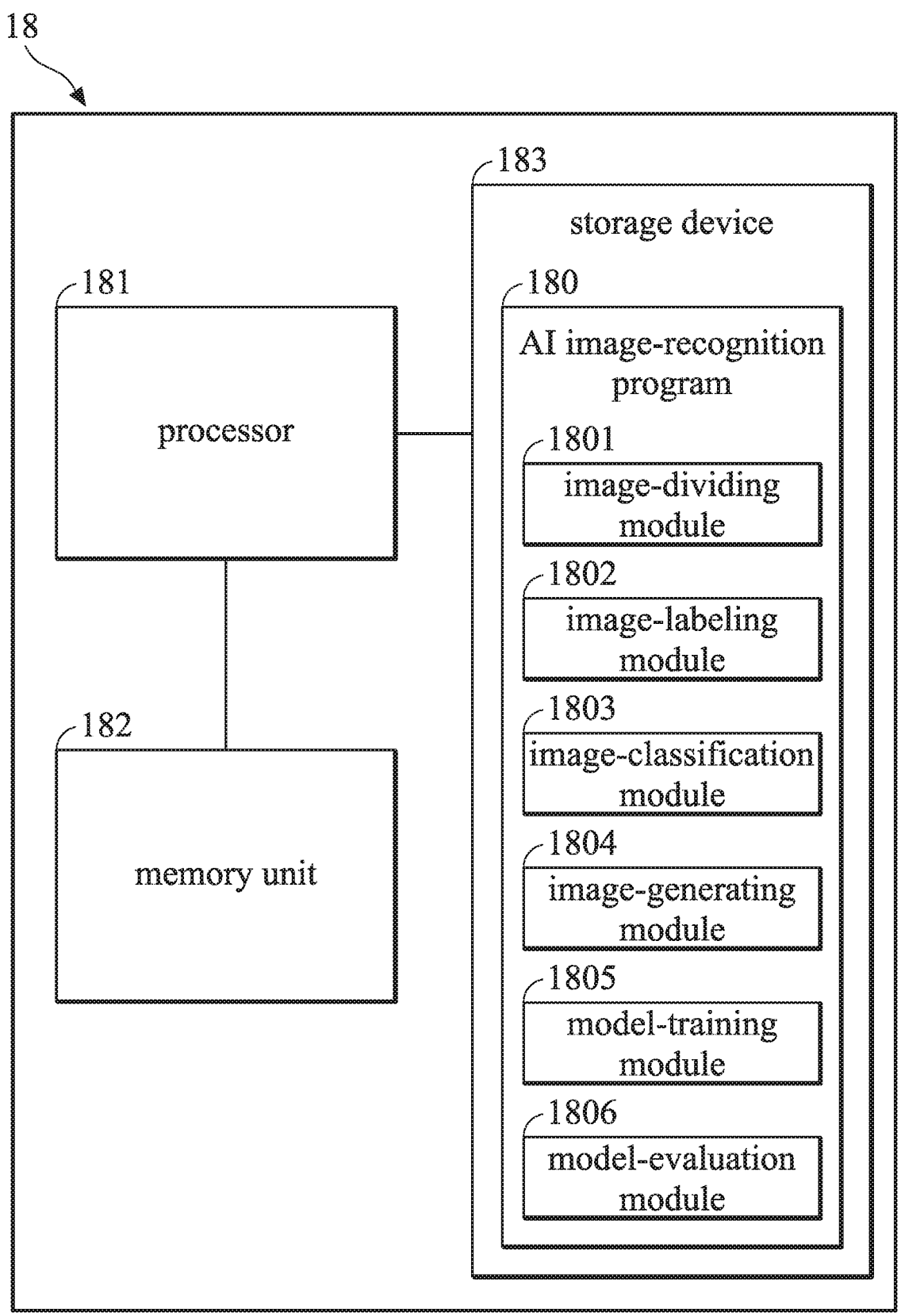
FIG. 2 is a block diagram of an image-recognition apparatus in accordance with an embodiment of the disclosure.

FIG. 2 is a block diagram of an image-recognition apparatus in accordance with an embodiment of the disclosure.

The image-recognition apparatus 18 can be implemented by one or more personal computers, servers, or other types of computing apparatuses. The image-recognition apparatus 18 may include a processor 181, a memory unit 182, and a storage device 183. The processor 181, for example, may be implemented by a central processing circuit (CPU) or a general-purpose processor, but the disclosure is not limited thereto. The memory unit 182 is a volatile memory such as a static random access memory (SRAM) or a dynamic random access memory (DRAM).

The storage device 183 may be a non-volatile memory such as a hard-disk drive (HDD), a solid-state disk, a flash memory, a read-only memory, an erasable programmable read-only memory (EPROM), an electrically erasable programmable read-only memory (EEPROM), or an e-fuse, but the disclosure is not limited thereto.

The storage device 183 stores an artificial-intelligence (AI) image-recognition program 180 that is configured to perform corresponding processing on the processed object image from the image-detection device 16, or on the check-point images that are recognized as having a defective status. For example, the AI image-recognition program 180 may include an image-dividing module 1801, an image-labeling module 1802, an image-classification module 1803, an image-generating module 1804, a model-training module 1805, and a model-evaluation module 1806. The processor 181 may load the AI image-recognition program 180 from the storage device 183 to the memory unit 182 for execution, thereby controlling and coordinating functions corresponding to modules 1801 to 1806.

The image-dividing module 1801 may be configured to cut the AOI object image from the image-detection device 16 to obtain the check-point image corresponding to each check point on the DUT 20. It should be noted that, in the second embodiment, since the image-detection device 16 transmits the check-point image recognized as the passing status or defective state to the image-recognition apparatus 18, it is not necessary for the image-dividing module 1801 to process the aforementioned check-point images. Accordingly, the image-dividing module is suitable for the case of the first embodiment.

In some embodiments, after the image-detection device 16 has transmitted the AOI object image to the image-recognition apparatus 18, the image-dividing module 1801 may first load the AOI object image, and the user interface of the image-dividing module 1801 can be used to set reference points, labeling range, search range, and range and number of check points, where each set of different settings can be saved as a corresponding template. Because there may be pixel shifts between images of different AOI object images from the image-detection device 16, the image-dividing module 1802 needs to set a larger search range outside each labeling range, and the relative positions of different check points can be set within each labeling range. In addition, the labeling range can be regarded as a positioning point or positioning range. When the AOI object images of the same DUT 20 are input into the image-dividing module 1801, the default search range of the template currently being used can be used to find the positioning points (i.e., labeling range), and the AOI object image can be divided into a plurality of check-point images corresponding to the check points according to the relative positions of each check point within the labeling range, wherein the filename of each check-point image may include a name, time, position, number, etc. of the DUT 20.

The image-labeling module 1802 may be configured to obtain the check-point image corresponding to each check point from the image-dividing module 1801 or the image-detection device 16, wherein the check-point image is not labeled or classified yet. For example, the image-labeling module 1802 may load the check point images in batches, for example, 8 check-point images (not limited) are in a batch. In some embodiments, the operator may label each check-point image in each batch, and the image-labeling module 1802 may generate a user interface to display each check-point image in the current batch, and obtains the label corresponding to each check-point image, wherein the aforementioned label may include a "pass" state or defective statuses (e.g., NG1, NG2, NG3, . . . , NGN, etc.). In some other embodiments, the image-labeling module 1802 may include an image-recognition function that is configured to perform image recognition on each check-point image to determine the status of each check-point image, such as the pass state or defective state. Taking a printed circuit board (PCB) as an example, the defective status of each check point may include: missing component, skew, tombstone, wrong component, foreign component, flipped component, wrong polarity, lifted lead, lead defective, solder bridge, insufficient solder, short circuit, false welding (air welding), cold welding, etc., but the disclosure is not limited thereto.

Accordingly, after labeling each check-point image through the image-labeling module 1802, different groups of check-point images can be obtained, for example, each of the pass state and defective states NG1, NG2, NG3, . . . , NGN, etc. can be regarded as different groups, and the image-labeling module 1802 may store the check-point images in different groups into different sub-directories.

The image-classification module 1803 is configured to allow the operator to classify the check-point images in each group labeled by the image-labeling module 1802. The image classification module 1803 can, for example, classify a plurality of check-point images that have high degree of similarity in content or attributes into the same group. In another embodiment, the image-classification module 1803 may set a similarity threshold, and generate another user interface to display the check-point images in each group. For example, the image-classification module 1803 can set a similarity threshold, and calculate the similarity between each check-point image in each group and a reference image in at least one type, and display the check-point images that have similarity values higher than the similarity threshold in each group. Specifically, the user may classify at least one check-point image (e.g., can be regarded as a reference image) in the "pass" group into a specific type. During classifying the check-point images in each group, the image-classification module 1803 may calculate the similarity values between the pre-classified check-point image and each unclassified check-point image in each group, and filter the check-point images having similarity values higher than the similarity threshold. The image-classification module 1803 will display the filtered check-point images on the user interface, and perform the classification process on the filtered check-point images. The unclassified check-point images in other groups can be classified into corresponding types in a similar manner.

For example, a resistor may have a higher similarity with another resistor, but a resistor may have a lower similarity with a capacitor. In response to the similarity between each check-point image in each group and a reference image in a specific type in each group, the image-classification module 1803 may classify each check-point image having a similarity higher than the similarity threshold in each group to the same type. After performing the aforementioned process, the corresponding type of each check-point image can be obtained. If groups labeled by the image-labeling module 1802 can be divided into four groups such as "PASS", "NG1", "NG2", and "NG3", the image-classification module 1803 may further classify each check-point image in each of the four groups into a plurality of types, such as the similarity values between different components can be used as the classification criterion, and the same or similar components can be classified into the same type. For example, the image-classification module 1803 may classify the check-point images of the resistors, capacitors, and other components in the "PASS" group respectively into Type 1, Type 2, and Type 3. Similarly, the image-classification module 1803 may also classify the check-point images of the resistors, capacitors, and other components in each of the NG1, NG2, and NG3 groups respectively into Type 1, Type 2, and Type 3 in the corresponding group of NG1, NG2, and NG3 groups.

After the aforementioned image-classification operation is completed, the image-classification module 1803 can obtain group-type structured data (e.g., first structured data) and each type in each group may include corresponding numbers of check points. For example, the PASS-Type1 group-type may include check points 1, 3, and 5, and the PASS-Type2 group-type may include check point 2, and the PASS-Type3 group-type may include check points 4 and 6.

Figure 3:
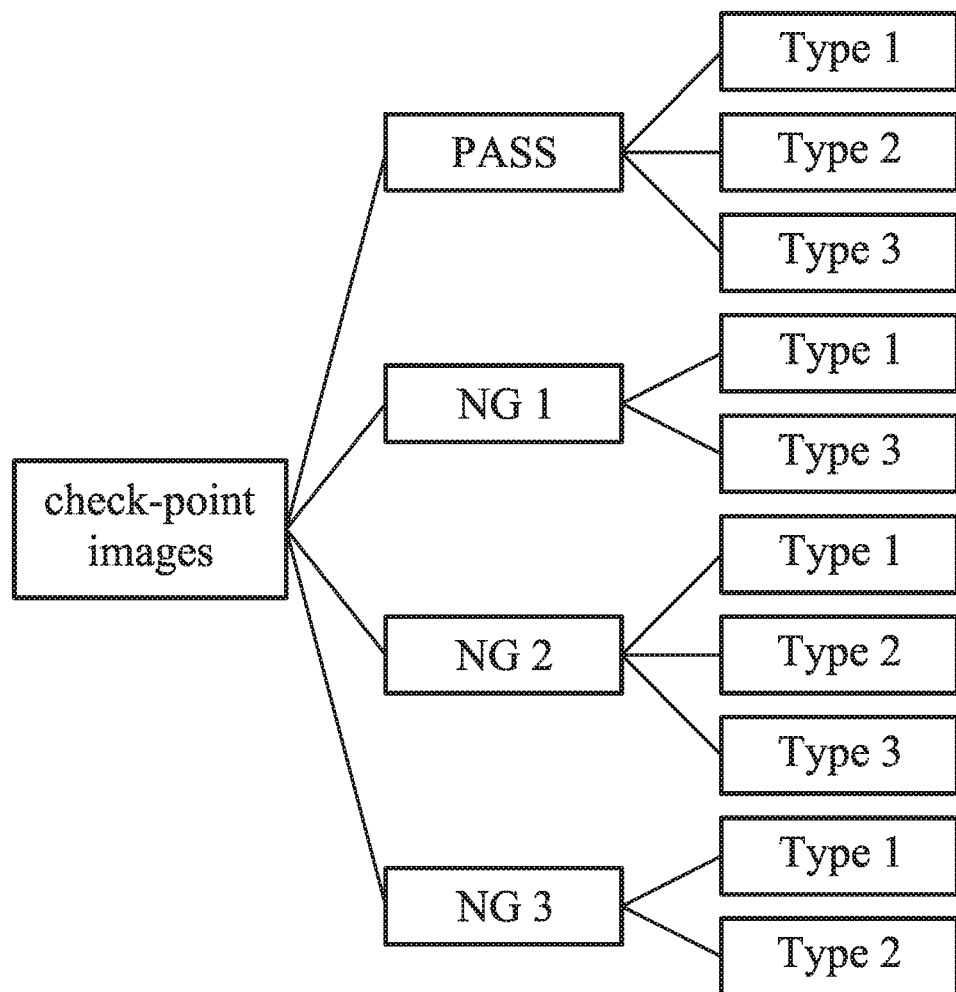
FIG. 3 is a diagram of the first structured data in accordance with an embodiment of the disclosure.

The structured data obtained from the image-classification operation is shown in FIG. 3. The image-classification module 1803 can output the structured data and its corresponding information (e.g., numbers of check-point images) and check-point images as a classification file, and write the classification file in the storage device 183. In the classification file, the name of each group can be set as main directories, and the name of each type in each group can be set as sub-directories, and each sub-directory may include the check-points images and their numbers after image classification. In addition, the classification file generated by the image-classification module 1803 can be used by the image-recognition apparatus 18 for subsequent use. For example, the user may read the previously stored classification file through the user interface of the image-classification module 1803, so the image-classification module 1803 can use the information corresponding to the classification file of the structured data to classify the check-point images generated by the image-dividing module 1801 or the check-point images received from the image-recognition apparatus 16.

It should be noted that, in the aforementioned embodiment, not every defective status may include all types. For example, if group NG1 indicates that the wrong polarity of the components on the PCB, the NG-Type1 group-type may indicate wrong polarity of capacitors. However, the resistors do not have the problem of wrong polarity, and thus group NG1 does not include the type Type2, as shown in FIG. 3.

The image-generating module 1804 is configured to perform image generation on the one or more group-types generated by the image-classification module 1803 so as to solve the problem of unevenness in the number of samples of the check-point images of some group-types. For the classification results of the group-types of the check-point images of the DUT 20 generated by the aforementioned procedure, the number of check-point images in each group-type is not necessarily even.

For example, with regard to the AI model in the model-training module 1805, it requires a huge amount of data and samples during the training phase. If the model-training module 1805 trains the AI model directly using the classification result (i.e., the first structured data) of the group-types generated by the image-classification module 1803, the AI model may have a low recognition rate, or cause misjudgment or insufficient confidence level.

Accordingly, the image-generating module 1804 may perform image generation on the one or more group-types generated by the image-classification module 1803, so that the number of check-point images in each group-type is even. For example, the image-generating module 1804 can allow the user to preset the range of various image parameters for image generation through the user interface, where the image parameters may include, but are not limited to, the brightness or red/green/blue pixels, contrast, contrast and gamma, rotation angle, pixel offset values along the X-axis and Y axis, sharpness, blurriness, scaling ratio, etc. In an embodiment, the range of the rotation angle can be set to be within −10 degrees to +10 degrees, and the pixel offset value along the X-axis can be set to be within −10 pixels to +10 pixels, and the pixel offset value along the Y-axis can be set to be within −10 pixels to +10 pixels. Other unchanged image parameters can use the preset values of the image-generating module 1804.

For example, the image-generating module 1804 may read the structured data (e.g., the first structured data) including one or more group-types generated by the image-classification module 1803, and collect statistics on the number of check-point images in each group-type. In order to allow the AI model of the model-training module 1805 to achieve better training results and model evaluation, it is better to have a greater and even number of check-point images in each group-type. For example, the user may set the number of check-point images of the selected group-type to be increased by X or increased to Y through the user interface of the image-generating module 1804, so that the numbers of check-point images in different types in the same group can be even, thereby generating second structured data.

Specifically, the check-point images in each group-type of group-type structured data (e.g., the first structured data) generated by the image-classification module 1803 can be regarded as original check-point images, and the check-point images randomly generated by applying different ranges of image parameters can be regarded as simulated check-point images. For example, if types Type1, Type2, and Type3 in the PASS group originally have 500, 250, and 100 original check-point images, respectively, and the target number of images set by the image-generating module 1804 is 1000 (i.e., X=1000, increased to 1000 images), after the image-generating module 1804 processes the types Type1, Type2, and Type3 in the PASS group, the number of check-point images in types Type1, Type2, and Type3 are changed to 1000. For example, the PASS-Type1 group-type may include 500 original check-point images and 500 simulated check-point images, and the PASS-Type2 group-type may include 250 original check-point images and 750 simulated check-point images, and the PASS-Type3 group-type may include 1000 original check-point images and 0 simulated check-point images. That is, after being processed by the image-generating module 1804, the number of check-point images in each type of PASS group is even. Meanwhile, the PASS group may include 3000 check-point images. Accordingly, if the sum of the number of original check-point images and the simulated check-point images in the first group is equal to a first number (e.g., 3000), the sum of the number of original check-point images and the simulated check-point images in each of the other groups is also equal to the first number.

Similarly, the image-generating module 1804 also performs a corresponding image-generating process on groups NG1, NG2, and NG3. That is, after being processed by the image-generating module 1804, each of groups NG1, NG2, and NG3 includes 3000 check-point images. If group NG1 only includes types Type1 and Type3, each of the types Type1 and Type3 includes 1500 check-point images. Similarly, group NG3 may only include types Type1 and Type2, and each of the types Type1 and Type2 includes 1500 check-point images. In addition, since group NG2 includes types Type1, Type2, and Type3, after being processed by the image-generating module 1804, each of the types Type1, Type2, and Type3 includes 1000 check-point images. In some embodiments, the image-generating module 1804 may, for example, save the simulated check-point images of each group-type generated by the image-generating process into other sub-directories to distinguish them from the original check-point images. In other words, the sum of the number of original check-point images and the number of simulated check-point images in each group of each group is equal to the first number (e.g., 3000) divided by the number of types in each group (e.g., two types are in group NG1, and 3 types are in group NG2).

The model-training module 1805 is configured to allow an AI model to perform model training using training-set data. For example, the training-set data and testing-set data used in the training phase of the AI model should be different, so that the AI model is less likely to produce "overfitting" when recognizing the results. In an embodiment, the second structured data generated by the image-generating module 1804 can be divided into a training-set data and a testing-set data that are stored in different directories. The model-training module 1805 can specify to read the corresponding directory of the training-set data as a source of training data. In another embodiment, the second structured data generated by the image-generating module 1804 does not specifically distinguish between training-set data and testing-set data, and the model-training module 1805 can select the directory of the second structured data, and the check-point images in each group-type of second structured data can be divided into the training-set data and testing-set data according to a preset distribution ratio of the training-set data. For example, the distribution ratio of the training-set data is 0.3, the model-training module 1805 may use 30% of the check-point images in each group-type in the second structured data as the training-set data, and the remaining 70% of check-point images in each group-type in the second structure data are used as the testing-set data.

In the embodiment, the model-training module uses "transfer learning" technology to create an AI model, wherein the AI model may, for example, include an input layer, a transfer model, a classification layer, and an output layer, and the user may set the parameters corresponding to the input layer, transfer model, classification layer, and output layer through the user interface of the AI image-recognition program 180, and the user may also set the strategic parameters of the AI model during the training phase, such as the type of optimizer, the learning rate, the number of epochs, and the batch size.

With regard to the input layer, the user may set the input image size of the input layer according to the actual size of the check-point image to be processed. When the size of the actual check-point image is different from the set input image size, the model-training module 1805 can interpolate the input check-point image to scale it to the set input image size.

The model-training module 1805 provides a variety of open-source transfer models for selection, such as Mobile-Net, ResNet, and so on. The user can choose whether to turn on the weight parameters of partial layers of the transfer model for retraining, and whether to turn on flattening to retain all information functions. The classification layer of the AI model is composed of fully-connected layers, and the user can decide how many layers to construct in the classification layer, the number of neurons in each layer, and whether each layer introduces a dropout function. With respect to the output layer of the AI model, the model-training module 1805 can automatically read the directory name of the first layer of the input data as the classification mark according to the data structure of the input data (e.g., the second structured data), thereby automatically establishing the output layer.

The model-evaluation module 1806 is configured to evaluate the performance of the AI model trained by the model-training module 1805 on the testing-set data in the second structure data, that is, the testing-set data can be input into the trained AI model to obtain a model evaluation of the AI model. In addition, the model-evaluation module 1806 can also use the AI model trained by the model-training module 1805 to perform data cleaning on the training-set data in the second structured data.

For example, during the evaluation phase of the AI model, the model-evaluation module 1806 may input each check-point image in the testing-set data into the AI model to generate a corresponding recognition result and confidence level. Then, the model evaluation module 1806 compares the recognition result of each check-point image in the testing-set data with the type labeled on each check-point image in the testing-set to obtain the model evaluation of the AI model (e.g., accuracy (or recognition rate)=the number of correct recognition results/the number of check-point images in the testing-set data). By calculating the model evaluation, the group-types with a low overall recognition rate or confidence can be found.

In an embodiment, if the model-evaluation module 1806 compares the recognition result of each check-point image in the testing-set data with the type labeled on each check-point image in the testing-set data, the recognition results of some check-point images in the testing-set data may be incorrect, but with a high degree of confidence, it can be determined that check-point images corresponding these recognition results may be labeled incorrectly. Accordingly, the model-evaluation module 1806 may perform a first data-cleaning procedure to filter out the check-point images and recognition results that may be labeled incorrectly, and delete these check-point images from the training-set data.

If the model-evaluation module 1806 compares the recognition result of each check-point image in the testing-set data with the type labeled on each check-point image in the testing-set data, the recognition results of some check-point images in the testing-set data may be correct, but the confidence is not high (e.g., below a threshold, where the threshold can be but not limited to 50%), indicating that the corresponding check-point image in the testing-set data may have multiple labels. That is, the same check-point image may be labeled with different group-types, so the confidence of the recognition result of the AI model will be low. Accordingly, the model-evaluation module 1806 may perform a second data-cleaning procedure to filter out the check-point images with low confidence in the testing-set data, and delete the check-point images, that correspond to the check-point images in the testing-set data, from the training-set data.

After the model-evaluation module 1806 has executed the first data-cleaning procedure and second data-cleaning procedure and has updated the training-set data, the AI image-recognition program 180 may then execute the image-labeling module 1802 to check the filtered check-point images one by one for re-labeling. If a specific check-point image will cause the AI model to misjudge in different group-types, it is inappropriate to re-label the specific check-point image and put the specific check-point back to the training-set data, and thus the image-labeling module 1802 deletes the specific check-point image. In addition, the AI image-recognition program 180 may re-execute the image-generating module 1804 to further check the number of check-point images in the group-types having a lower recognition rate and/or confidence, and generate proper simulated check-point images for these group-types to update the second structured data. Accordingly, after updating the second structured data, the model-training module 1805 may divide a new training-set data from the updated second structured data to retrain the AI model, thereby improving the recognition rate and confidence of the recognition result of the AI model.

Figure 4:
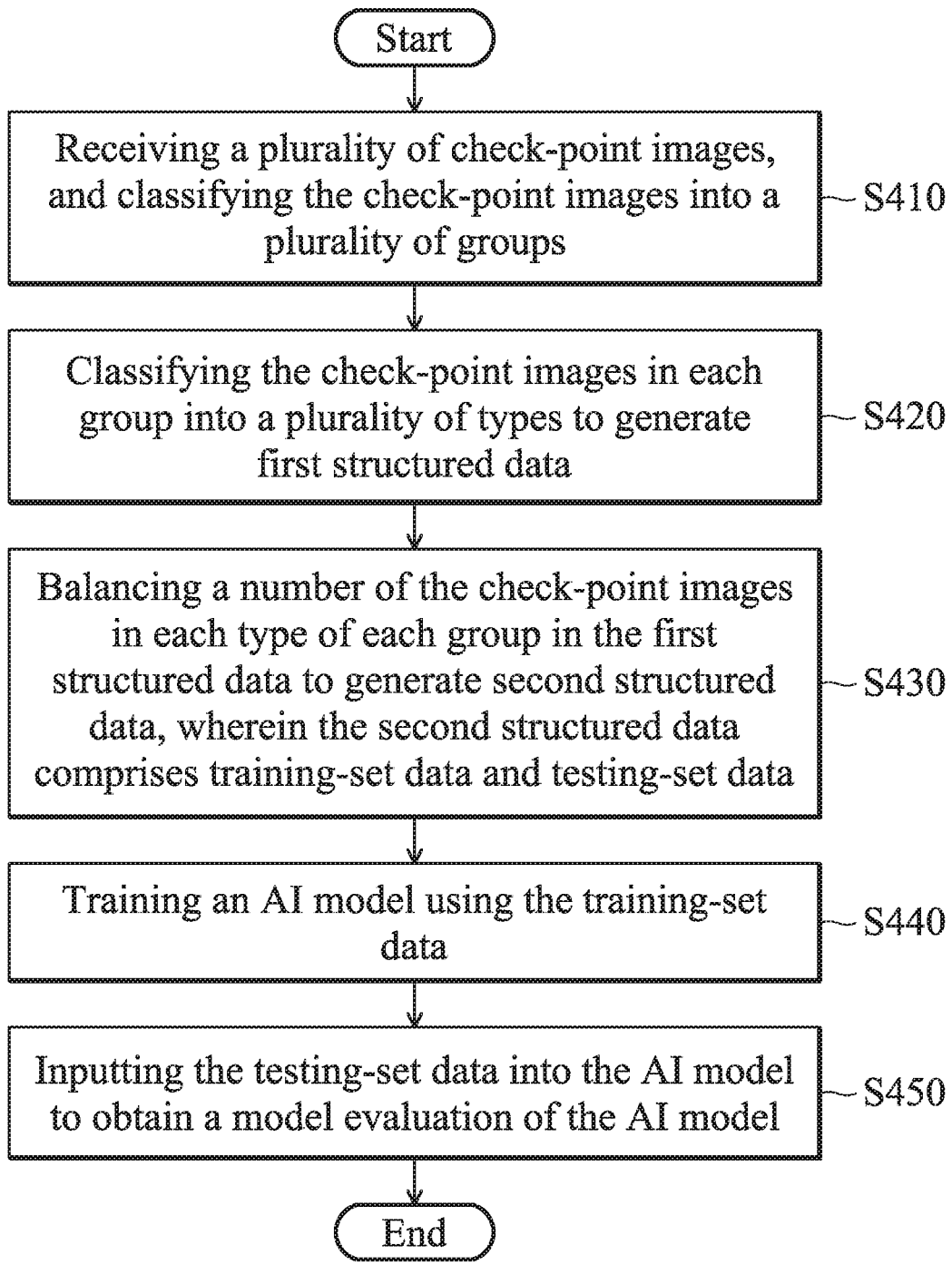
FIG. 4 is a flow chart of an image-recognition method in accordance with an embodiment of the disclosure.

FIG. 4 is a flow chart of an image-recognition method in accordance with an embodiment of the disclosure.

Referring to FIG. 2 and FIG. 4, in step S410, a plurality of check-point images are received, and the check-point images are divided into a plurality of groups. For example, the source of the check-point images may be check-point images from the AOI device 14, that is, the AOI device 14 has first divided the object image of the DUT into the check-point image corresponding to each check point of the DUT, and the check-point images are transmitted to the image-recognition apparatus 18. The source of the check-point images may also be the object image of the DUT from the AOI device 14. Accordingly, the image-dividing module 1801 of the image-recognition apparatus 18 may divide the object image into the check-point image corresponding to each check point of the DUT. In addition, the image-labeling module 1802 may add a group label on each check-point image to classify the check-point images into a plurality of groups, such as the pass status (e.g., PASS) and defective statuses (e.g., NG1, NG2, and NG3). It should be noted that when the image-labeling module 1802 is labeling the groups, types of different components on the DUT are temporarily not considered.

In step S420, the check-point images in each group are divided into a plurality of types to generate first structured data. For example, the image-classification module 1803 may classify the check-point images in each group into one or more types according to similarities of the check-point images to generate the first structured data.

In step S430, the number of check-point images in each type of each group in the first structured data is balanced to generate second structured data, wherein the second structured data includes training-set data and testing-set data. For example, the check-point images in each group-type of the group-type structured data (e.g., the first structured data) generated by the image-classification module 1803 can be regarded as original check-point images, and the check-point images randomly generated by applying different ranges of image parameters can be regarded as simulated check-point images. After the first structured data is processed by the image-generating module 1804, each of different types in the same group of the second structured data may have the same total number of original check-point images and simulated check-point images.

In step S440, an AI model is trained using the training-set data. The AI model may include an input layer, a transfer model, a classification layer, and an output layer, and the user may set the parameters corresponding to the input layer, transfer model, classification layer, and output layer through the user interface of the AI image-recognizing program 180, and the user may also set the strategic parameters of the AI model during the training phase, wherein the strategic parameters may include the optimizer, learning rate, epochs, and batch size.

In step S450, the testing-set data is input into the AI model to obtain a model evaluation of the AI model. For example, during the evaluation phase of the AI model, the model-evaluation module 1806 may input each check-point image in the testing-set data into the AI model to generate a corresponding recognition result and confidence. Then, the model evaluation module 1806 compares the recognition result of each check-point image in the testing-set data with the type labeled on each check-point image in the testing-set to obtain the model evaluation of the AI model (e.g., accuracy (or recognition rate)=the number of correct recognition results/the number of check-point images in the testing-set data). By calculating the model evaluation, the group-types with a low overall recognition rate or confidence can be found.

In view of the above, an image-recognition apparatus, an image-recognition method, and a computer program product thereof are provided in the disclosure. The image-recognition apparatus, image-recognition method, and computer program product thereof are capable of determining the status of each check-point image in the training-set data of the structured data using the AI model. In addition, the training-set data that is the erroneously labeled or has multiple labels can be appropriately filter out via the model-evaluation procedure to update the training-set data, and the updated training-set data can be used to retrain the AI model to improve the recognition rate and confidence of the AI model. Accordingly, it can achieve the effect of reducing the workload of the product line operators and reducing production costs.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer program product comprising a non-transitory computer-readable storage medium storing an artificial-intelligence image-recognition program which is executed by a computer to cause the computer to function as:
   an image-labeling module, configured to receive a plurality of check-point images, and classify the check-point images into a plurality of groups;
   an image-classification module, configured to classify the check-point images in each group into a plurality of types for each group to generate first structured data;
   an image-generating module, configured to balance a number of check-point images in each type of each group in the first structured data to generate second structured data, wherein the second structured data comprises training-set data and testing-set data;
   a model-training module, configured to train an artificial-intelligence (AI) model using the training-set data; and
   a model-evaluation module, configured to input the testing-set data into the AI model to obtain a model evaluation of the AI model;
   wherein there is a first number of the check-point images in each group of the second structured data generated by the image-generating module, and a second number of check-point images in each type of the plurality of types for each group is obtained by dividing the first number by a number of the plurality of types for each group.

2. The computer program product as claimed in claim 1, further comprising:
   an image-dividing module, configured to receive an object image of a device under test (DUT) from an automated-optical-inspection (AOI) apparatus, and divide the object image into the check-point images corresponding to a plurality of check points on the DUT.

3. The computer program product as claimed in claim 2, wherein the image-dividing module sets a search range on the object image, and sets one or more labeling ranges within the search range, and sets relative positions for different check points within each labeling range,
   wherein the image-dividing module searches the one or more labeling ranges within the search range, and divide the object image into the check-point image corresponding to each check point according to the relative position of each check point within the corresponding labeling range.

4. The computer program product as claimed in claim 1, wherein the check-point images are from an AOI apparatus, and the check-point images correspond to a plurality of check points of a DUT captured by the AOI apparatus.

5. The computer program product as claimed in claim 1, wherein each group labeled by the image-labeling module corresponds to a plurality of defective statuses and a pass status of a plurality of check point on a DUT.

6. The computer program product as claimed in claim 1, wherein the image-classification module classifies the check-point images in each group into the plurality of types for each group to generate the first structured data according to similarities of the check-point images in each group.

7. The computer program product as claimed in claim 6, wherein in response to the similarity between each check-point image in each group and one or more reference images in a specific type being higher than a similarity threshold, the image-classification module classifies the check-point images in each group having similarities higher than the similarity threshold into the specific type.

8. The computer program product as claimed in claim 6, wherein each type in each group of the first structured data records corresponding numbers of the check-point images, which is output as a classification file by the image-classification module.

9. The computer program product as claimed in claim 1, wherein the image-generating module sets a variation range of each of one or more image parameters, and the image-generating module randomly generates each image parameter from the variation range of each image parameter to perform image processing on the check-point images to generate a plurality of simulated check-point images.

10. The computer program product as claimed in claim 9, wherein a first sum of a number of the check-point images and a number of the simulated check-point images in a first group among the groups is equal to a third number, and a second sum of a number of the check-point images and a number of the simulated check-point images in each of other groups among the groups is equal to the third number,
    wherein the sum of the number of check-point images and the number of simulated check-point images in each type of each group is equal to the third number divided by a number of types in each group.

11. The computer program product as claimed in claim 1, wherein the model-training module divides the second structured data into the training-set data and the testing-set data according to a predetermined ratio.

12. The computer program product as claimed in claim 11, wherein the AI model comprises an input layer, a transfer model, a classification layer, and an output layer, and the model-training module defines a plurality of strategic parameters during a training procedure for the transfer model, wherein the strategic parameters includes a type of an optimizer, a learning rate, a number of epochs, and a batch size.

13. The computer program product as claimed in claim 1, wherein the model-evaluation module further determines one or more first types with a lower overall recognition rate or confidence, and filters out the check-point images that are erroneously labeled or have multiple labels in the second structured data.

14. The computer program product as claimed in claim 13, wherein the model-evaluation module further executes a first data-cleaning process to delete the check-point images that are erroneously labeled from the training-set data to update the second structured data.

15. The computer program product as claimed in claim 14, wherein the model-evaluation module further executes a second data-cleaning process to filter out one or more first check-point images that have multiple labels, and deletes the check-point images, that correspond to the one or more first check-point images, from the training-set data to update the second structured data.

16. The computer program product as claimed in claim 15, wherein the model-training module further retrains the AI model using the updated second structured data.

17. An image-recognition method, comprising:
receiving a plurality of check-point images, and classifying the check-point images into a plurality of groups;
classifying the check-point images in each group into a plurality of types for each group to generate first structured data;
balancing a number of the check-point images in each type of each group in the first structured data to generate second structured data, wherein the second structured data comprises training-set data and testing-set data;
training an artificial-intelligence (AI) model using the training-set data; and
inputting the testing-set data into the AI model to obtain a model evaluation of the AI model;
wherein there is a first number of the check-point images in each group of the second structured data generated by the image-generating module, and a second number of check-point images in each type of the plurality of types for each group is obtained by dividing the first number by a number of the plurality of types for each group.

18. An image-recognition apparatus, comprising:
a non-volatile memory, configured to store an artificial-intelligence (AI) image-recognition program; and
a processor, configured to execute the AI image-recognition program to perform the following steps:
receiving a plurality of check-point images, and classifying the check-point images into a plurality of groups;
classifying the check-point images in each group into a plurality of types for each group to generate first structured data;
balancing a number of the check-point images in each type of each group in the first structured data to generate second structured data, wherein the second structured data comprises training-set data and testing-set data;
training an artificial-intelligence (AI) model using the training-set data; and
inputting the testing-set data into the AI model to obtain a model evaluation of the AI model;
wherein there is a first number of the check-point images in each group of the second structured data generated by the image-generating module, and a second number of check-point images in each type of the plurality of types for each group is obtained by dividing the first number by a number of the plurality of types for each group.

* * * * *